UNITED STATES PATENT OFFICE.

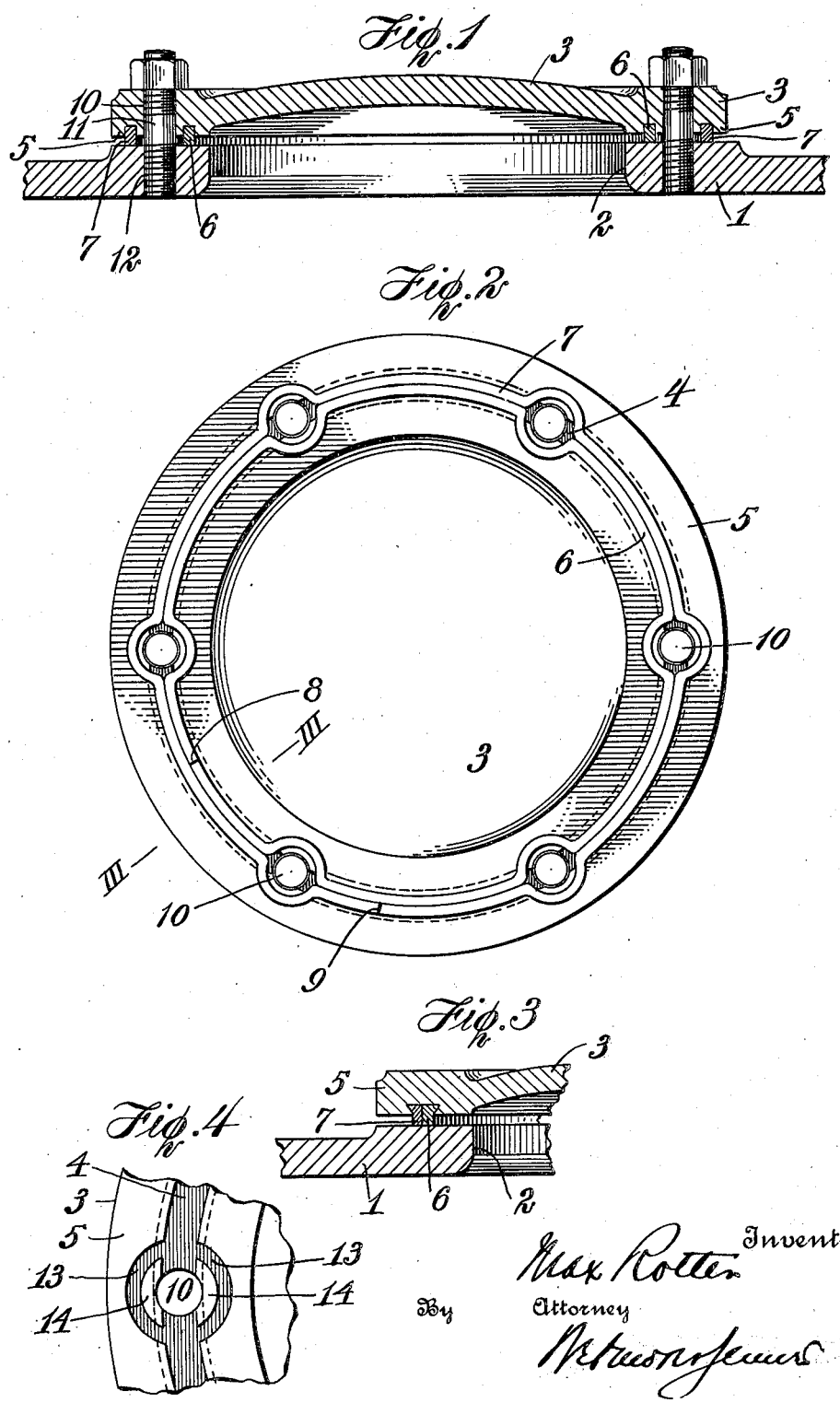

MAX ROTTER, OF ST. LOUIS, MISSOURI, ASSIGNOR TO BUSCH-SULZER BROS.-DIESEL ENGINE COMPANY, OF ST. LOUIS, MISSOURI, A CORPORATION OF MISSOURI.

PACKING OR GASKET CONSTRUCTION.

1,327,965.  Specification of Letters Patent.  Patented Jan. 13, 1920.

Application filed April 14, 1917. Serial No. 161,966.

*To all whom it may concern:*

Be it known that I, MAX ROTTER, a citizen of the United States, residing in the city of St. Louis, in the State of Missouri, have invented the following described Improvements in Packing or Gasket Constructions.

This invention is an improvement in packing or gasket constructions adapted to be secured to or carried by the face of one of two clamped members to form an air and liquid tight closure with the other, and its objects relate to the security and permanence of such gaskets and the compactness thereof with reference to the clamped areas and their bolts or fastenings and also to the means of dividing the gasket around the bolts as hereinbelow more fully described.

In the accompanying drawings:

Figure 1 is a vertical sectional view through a closure construction embodying the improved gasket;

Fig. 2 is a bottom plan view of the cover member of a closure perforated to receive attaching bolts, and showing the improved gasket fitting within an undercut groove made in the cover, the layers of the gasket being parted to surround the perforations;

Fig. 3 is a vertical sectional view taken on the line III—III of Fig. 2;

Fig. 4 is an enlarged fragmentary bottom plan view, showing the under-cut groove in the cover member, and the auxiliary grooves surrounding the bolt holes formed therein.

The reference numeral 1 represents a fragmentary part of the body portion of a pump chamber, crank case, compression cylinder, or any receptacle or member having an access opening 2, or required to be clamped leak-tight to another. A cover 3 is provided for closing the opening 2 and consists of a body portion having a continuous groove 4 cut adjacent the perimeter thereof or formed in a surrounding flange 5 with which such covers are usually provided. In the embodiment illustrated, the cover is shown circular in shape, but it is to be understood that it may be rectangular, or any shape that the exigencies of the opening to be closed may require, since the novel feature of the invention resides in the construction of a gasket and its application to the clamped member regardless of the function of the latter. The groove 4 is preferably under-cut as shown in Figs. 2, 3 and 4 so as to provide a dovetail groove to receive and retain the gasket.

The gasket comprises two narrow strips or layers of leather or other gasket material which are numbered on the drawing 6 and 7. These strips are fitted within the groove 4 on edge and contiguous to each other, the combined thickness of the two being substantially equal to the width of the groove 4. Where the layers 6 and 7 of the gasket are fitted within a dovetail groove as in the present case they are pressed therein by any suitable means, so as to interlock therewith as shown in Fig. 3 and they are thereby securely held in place. Each may be made of a continuous strip of the desired length and their abutting ends are disposed at points 8 and 9 which do not register.

The bolt holes 10 intersect or coincide with the gasket groove 4 and are of course arranged to register with the bolts or studs 11 on the body portion which constitute the fastening means. By reason of the employment of double layers or strips in the groove 4 the said strips may be parted around the bolt holes, where they intersect the groove, and so as to distribute the clamping pressure thereon while still retaining the same gasket area available for preventing leakage. For this purpose a circular groove 13 is milled out concentric with each bolt hole and equal in width to one-half the width of groove 4. The layers 6 and 7 of the gasket which are arranged side by side in the groove 4 are parted at or near the point where the bolt holes intersect the groove and each layer is fitted in its adjacent limb of the milled groove 13, which limb constitutes a branch of the main groove 4, and is held out of contact with the bolt 11 by the intervening wall portion 14. The grooves 13 are not under-cut; the under-cutting of the main groove 4 suffices to retain the gasket strips in place. As thus equipped the clamped members 1 and 3 may be separated and replaced an indefinite number of times without dislodging or impairing or defacing the gasket and it is a further consequence of the parting of the gasket strips around the bolts or bolt holes that the gasket material does not tend to become more densely compressed on one side than on the other so that the studs or bolts always aline with the axes of the bolt holes even after repeated removals. Various other advantages also enure from the employment of double or multiple strips in a single groove, all of which are characteristic of the various forms which this invention may take within the scope of the following claims.

Claims.

1. A gasket construction comprising the combination with the gasketed members provided with complementary bolt holes, one of said members being provided with main gasket groove sections between adjacent bolt holes and branch grooves surrounding each such bolt hole and joining the main groove sections, of a strip gasket disposed in said main groove sections and said branch grooves.

2. A gasket construction comprising in combination with the bolted together members, a double strip gasket between said members, the strips whereof are contiguous between bolt holes and are parted at the bolt holes, one strip passing around each side thereof.

3. A gasket construction comprising a portion having an opening therein, a cover for the said opening, said cover having a main groove in one face thereof, and perforations intersecting the said groove, branch grooves in the cover surrounding the perforations and connected with the main groove, and a gasket composed of a plurality of layers of material fitting within the main groove and the branch grooves.

4. A device of the character described comprising two members forming a closure, one of the members having a continuous under-cut groove therein, a gasket within the groove and extending within the under-cut portions thereof for locking the gasket to the said member, said gasket being composed of a plurality of contiguous layers of material.

5. A gasket construction comprising two members forming a closure, one of the members having a main groove in one face thereof and perforations intersecting the said groove, branch grooves in the said member surrounding the perforations and connected with the continuous groove, the branch grooves being half the width of the main groove, a gasket composed of two adjacent layers of material fitting within the continuous groove, the said layers parted and fitted within the branch grooves.

6. A gasket construction comprising a body portion having an opening therein, a cover for the said opening, the said cover having a main groove in one face thereof, the said body portion and cover having registering bolts and bolt holes intersecting the main continuous groove in the cover, opposed arcuate grooves made in the cover and surrounding the said bolts, the said arcuate grooves spaced from the bolts and having both ends in communication with the main groove, said arcuate grooves having a width half that of the main groove, a gasket composed of a plurality of layers of material fitting within the continuous groove, the layers of the gasket parted and fitted within the said arcuate grooves.

7. A gasket construction comprising in combination with the bolted-together members, a gasket groove containing a double strip gasket and intersected by the bolts, the latter being disposed between the strips of the gasket.

8. A gasket construction comprising in combination with the two gasketed members and bolts passing through said members for clamping the same together, a strip gasket between said members, said strip being parted adjacent each bolt and a part thereof being fitted at each side of each bolt.

In testimony whereof, I have signed this specification.

MAX ROTTER.